Sept. 30, 1947.  W. J. HUGHES  2,428,222
TELEMETERING DEVICE
Filed July 27, 1946

INVENTOR.
Walter J. Hughes,
BY

Patented Sept. 30, 1947

2,428,222

UNITED STATES PATENT OFFICE 2,428,222

TELEMETERING DEVICE

Walter J. Hughes, Chicago, Ill., assignor to Infilco Incorporated, Chicago, Ill., a corporation of Delaware Application July 27, 1946, Serial No. 686,712

7 Claims. (Cl. 177—351)

This invention relates to a telemetering device, and particularly to a transmitter adapted to give an impulse of a time duration proportional to the rate of rotation of a shaft.

A primary object of the present invention is to provide a simple and accurate mechanism for giving an electrical impulse of a time duration proportional to the speed of a shaft.

Another object of the present invention is to provide an improved telemetric sender or transmitter.

These and other objects of the present invention will be obvious from the specification and claims which follow.

Modern industry uses many types of telemetering instruments which either transmit a measurement from one point to another, or automatically use a measurement taken at one point to control operation of some machine at another point. Various types of transmissions are used, one of the most common being an electrical impulse of a time duration proportional to the quantity being measured. My present invention specifically relates to an electric telemetering transmitter or sender which gives an electric impulse of a time duration proportional to the speed of a shaft, which shaft may be driven by a meter, such as the meter described in my copending application, Serial No. 686,711, filed July 27, 1946, or in a mechanical type water meter which has a shaft rotating at a speed proportional to the volume of water being measured.

My invention will be readily understood from the description and drawings in which Figure 1 is a horizontal cross-sectional view of the preferred embodiment of my invention.

Figure 1:
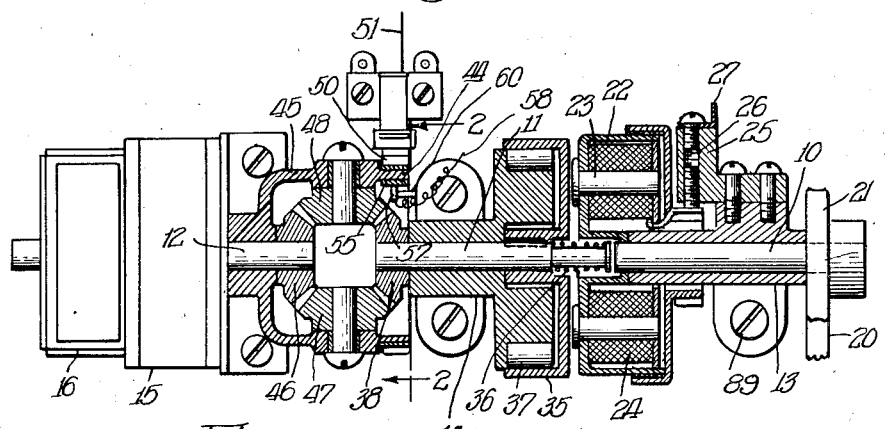

The apparatus of my invention is mounted on three coaxially aligned shafts: a meter driven shaft 10, a clutch shaft 11, and a motor driven return shaft 12, the first two of which are mounted in bearings 13 and 14 respectively and the latter of which is journaled in the gear reducer 15 attached to the return motor 16. Preferably the gear reducer 15 is such as to convert the speed of the motor 16 to a speed of one revolution per minute in shaft 12.

The meter driven shaft 10 can be driven in any suitable manner from a meter as by means of drive shaft 20 and gear 21. If the shaft 20 is driven by a motor meter such as described in my copending application above mentioned, which will normally operate through a speed range of from zero to 1500 revolutions per minute, it will be desirable that the gearing connecting shaft 20 to shaft 10 will give a speed reduction of about 150 to 1. If the shaft 20 is driven by a slow speed meter, such as a mechanical water meter, the speed reduction need not be so great, and in some instances no reduction will be necessary. I have found that a speed range of the driven shaft 10 suitable for most installations is from zero to about 10 R. P. M., and it is preferred that the gearing connecting the two shafts 20 and 10 be such as to give a range of speed of the shaft 10 from zero to about 10 R. P. M. Keyed on the free end of the meter driven shaft 10 is a magnetic clutch 22 of known construction. The clutch 22 will contain suitable electromagnets 23 with suitable windings 24. An insulated brush holder 25 is mounted on the bearing 13 and carries a carbon brush 26 which is connected by line 27 to binding post 28 of an electric timer hereinafter described.

The clutch shaft 11 terminates adjacent the meter driven shaft 10, and carries the one way clutch plate 35 slidably keyed thereto. A small spring 36 seated against the clutch plate 35 and a shoulder on the end of shaft 11 forces the clutch plate 35 from the clutch member 22 when the magnets 23 are deenergized. However when the magnets 23 of the clutch 22 are energized, then the one way clutch plate is pulled into contact with the magnetic clutch 22 and rotates with it at the same speed as the rotation of the meter driven shaft 10. Bearing 14, in which the clutch shaft 11 is mounted, is preferably provided with friction pads 37 which prevent rotation of the clutch 35 when the magnets 23 of clutch 22 are deenergized. This prevents any rotation of the shaft 11 except during the time the magnetic clutch 22 is energized and specifically prevents any backward movement or rotation of the shaft 11 during periods of deenergization of the magnetic clutch 22. A small miter gear 38 is keyed to the other end of the clutch shaft 11 as shown.

Figure 2:
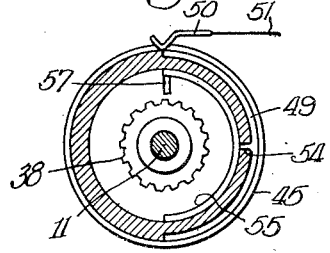
Figure 2 is a cross-sectional view of the contacts of Figure 1, taken along the plane designated by the line 2—2 in Figure 1.

A planetary gear cage 45 is rotatably mounted on the shaft 12 and a miter gear 46 is keyed to the same shaft. The cage 45 carries planetary miter gears 47 and 48 meshing with the miter gears 38 and 46 as shown. Preferably all of the miter gears are identical in size. The planetary gear cage 45 also carries a contact strip 49 which, in the example herein described, will extend half way around the cage, or through an angle of 180°, as shown in Figure 2. A brush or contact 50 engages the contact 49 and is connected by conductors 51 and 52 to one binding post of the motor 16 and by conductors 51 and 53 to the receiving instrument 100. The contact strip 49 is also connected as by conductor 54 to a second contact strip 55, which may also be mounted on the cage 45. In Figure 2 the second contact strip is also shown as extending half way around the cage 45. A brush 57, supported by insulated holder 60, engages the second contact strip 55 and is also connected, by means of conductor 58, to the binding post 59 of the timer 75.

Figure 3:
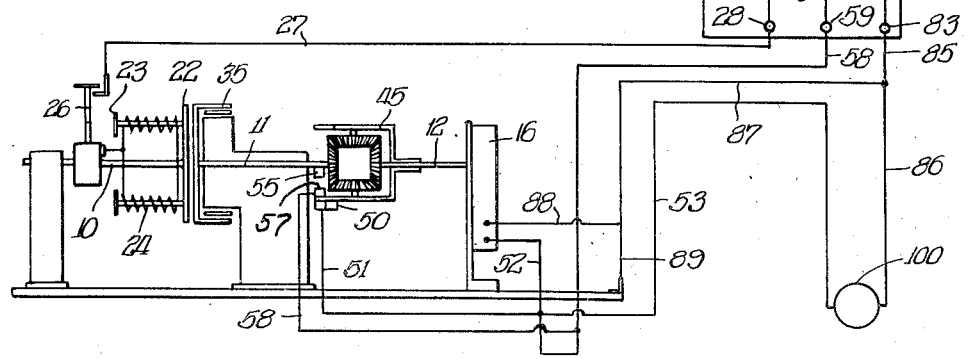
Figure 3 is a wiring diagram showing a method of connecting the embodiment shown in Figure 1 to give the desired impulse.

The timer 75, shown in Figure 3, is a well known instrument and need not be described in detail. It includes a clock 76 directly connected to source of power $L_1$ and $L_2$. The timer also includes a movable switch member 77 connected to source of power $L_1$ by means of conductor 78. Associated with the movable switch member 77 are contacts 79 and 80, the former being connected to binding post 28 and the latter to binding post 59 by conductors 81 and 82 respectively. The timer also includes a third binding post 83 which is connected to source of power $L_2$ by conductor 84 and to the telemetric receiving instrument 100 by conductors 85 and 86. The binding post 83 is also connected by conductors 85, 87 and 88 to the other binding post of the motor 16 and by conductors 85, 87 and 89 to ground at the telemetric transmitter.

The clock 76 is of a type to alternately move the movable switch member 77 to contact the contact points 79 and 80. When the transmitter is operated at the speeds herein shown, it is preferred that the clock 76 move the movable switch member 77 to alternately make a 5 second contact with the contact 79 and immediately thereafter a 55 second contact with the contact 80 thereby closing two circuits of 5 and 55 seconds, respectively, to complete a 60 second operating cycle.

For purposes of illustration we will assume that the cycle begins with the closing of the circuit to the magnetic clutch 22, which occurs when the movable switch member 77 engages the contact 79. The movable switch member 77 is connected to source of power $L_1$ by conductor 78 so that this circuit will include the contact 79, conductor 81, binding post 28, conductor 27, brush 26, winding 24 to ground, back through conductors 89, 87, and 85 to binding post 83, conductor 84 and source of power $L_2$. This circuit energizes the magnet 23 of the magnetic clutch 22, pulling the one way clutch 35 into contact with the clutch 22, the latter being driven at a speed proportional to the speed of rotation of the shaft 20. The engagement of clutches 22 and 35 causes shaft 11 to rotate at the same speed as shaft 10 and the rotation of the gear 38, operating through planetary gears 47 and 48 (gear 46 being stationary) causes the planetary gear cage 45 to rotate in one direction (counter-clockwise in Figure 2) at a speed of one-half that of the speed of shaft 11. The rotation of the cage 45 causes the contact strip 49 to move under the brush 50 through an angle which is proportional to the speed of the shaft 20. Thus the circuit just described, which lasts for 5 seconds, causes the contact strip 49 to advance under the brush 50 for a distance, or through an angle, proportional to the speed of rotation of the shaft 20. Obviously, when this circuit is broken the clutch is deenergized and the clutch plate 35 stops—the friction pads 37 holding it and gear 38 against rotation.

At the end of 5 seconds the circuit previously described is broken by movement of the movable switch member 77 to engage the contact 80, which establishes a new circuit including contact 80, conductor 82, binding post 59, conductor 58, brush 57, contact strip 55, conductor 54, contact strip 49, brush 50, conductors 51 and 52, motor 16, conductors 88, 87 and 85, binding post 83, conductor 84 and source of power $L_2$. The closing of this circuit also establishes a second circuit identical with the one just described down to the brush 50 and from thence including conductors 51 and 53, the instrument to be operated 100 and conductors 86 and 85, binding post 83, conductor 84, and source of power $L_2$. Thus the closing of the second circuit operates motor 16 of the transmitter and also machine 100 which is to be operated. The motor 16 drives the shaft 12 in a direction opposite of that of shafts 10 and 11, preferably at a speed of about 1 revolution per minute. The one way clutch plate 35 being held against rotation, the gear 38 remains stationary. Therefore, rotation of the gear 46 keyed to shaft 12 causes the cage 45 to move in a reverse direction at a speed of one-half a revolution per minute, thereby reversing the relative movement of the contact strip 49 in relation to the brush 50. Obviously the time required for the contact strip 49 to become disengaged from the brush 50 will depend upon the amount of rotation of the cage 45 during the closing of the first circuit. When the contact strip 49 and the brush 50 become disengaged the motor 16 is immediately stopped and the circuit to the instrument 100 is also immediately broken.

If the shaft 20 is rotating at the maximum speed for the telemetering instrument, then it would require the full 55 seconds of the engagement of the switch member 77 with the contact 80 to reverse the contact 49 to disengage brush 50, thereby causing an immediate reestablishment of the cycle. However, in most instances the maximum speed will not be measured and in those cases the circuits including the contact 80 will be broken when the contact strip 49 disengages the brush 50 and the circuits will be deenergized for the balance of the 55 second period—at the end of which period the cycle begins again.

Thus it is seen that the relative movement of the contact strip 49 under the brush 50 (counter-clockwise in Figure 2) is at a variable speed but for a constant time of 5 seconds, and the angle of such movement of the contact strip 49 (distance which the contact strip 49 advances under the brush 50) is directly in proportion to the speed of the input shaft 20. In the second part of the cycle the motor 16 operating at a constant speed returns the contact strip 49 at a constant speed but for a variable period until the contact strip 49 disengages the brush 50. Thus the motor 16 operates for a period which is directly proportional to the speed of rotation of the shaft 20. As the circuit to the instrument 100 is closed only during the period of operation of the motor 16, that instrument will be operated likewise for a time proportional to the speed of the input shaft 20. Thus it is seen that when the cycle starts the 180 degree contactor 49 is advanced (counter-clockwise in Figure 2) through an angle the size of which is in proportion to the speed of rotation of shaft 20, the displacement being made through the fixed period of 5 seconds of a 60 second cycle. The one way clutch then serves to prevent the angular measurement from being lost as the motor 16 begins to operate on completion of the 5 second circuit. The motor 16 drives the contactor 49 in a reverse direction (clockwise in Figure 2) at a rate fixed to evaluate the angular displacement in time. The duration of the circuit driving the motor 16 and also the instrument 100 is thus proportional to the movement occurring in the first or 5 second cycle which in turn is proportional to the quantity being measured. Thus the telemetric transmitter of my invention gives a time impulse to the instrument 100 of a time duration proportional to the quantity being measured. It will be noted that the one way rotation of clutch plate 35 (gear 38) and the one way rotation of the motor 16 (gear 46) in the opposite direction causes the gears in the planetary system in cage 45 to be in mesh in the same direction, so that there is no opportunity for slack in the gearing, thus providing accurate measurements regardless of the fit of the gears or the amount of wear to which they have been subjected.

It will be evident that the relative size of the gearing or the length of cycle can be varied without departing from the principle of my invention.

Manifestly many other modifications or variations in the invention hereinbefore set forth may be made by persons skilled in the art without departing from the spirit and scope hereof. Accordingly the appended claims are to be given an interpretation commensurate with the novelty herein described and as broad as may be permitted by prior art.

I claim:

1. A telemetric transmitter comprising a shaft driven at a speed proportional to the quantity being measured, a magnetic clutch on such shaft, a contact member rotated in one direction at a speed proportional to the speed of said shaft upon energization of the magnetic clutch, means including a constant speed motor for reversing the movement of the contact member at a constant speed, timing means alternately closing a circuit to said magnetic clutch for a predetermined portion of each cycle and then through said contact member to said motor for the balance of the cycle, said circuit to said motor being broken when said contact member returns to its original position, whereby the motor is operated for a period proportional to the speed of the said shaft, and means for transmitting a timed impulse to a receiving instrument during the period said motor is in operation.

2. A telemetric transmitter comprising a shaft constantly driven at a speed proportional to the quantity being measured, a rotatable contact member associated with said shaft, means including a constant speed motor for reversing the movement of the contact member at a constant speed, a fixed contact member associated with said rotatable contact member and adapted to engage said rotatable contact member in certain positions of its rotation, timing means adapted to engage said rotatable contact member to said shaft for a predetermined portion of each cycle and thereupon disengage said rotatable contact member and shaft and simultaneously close a circuit to said motor through said contact members, whereby the motor is operated for the period required to disengage said contact members, and means for transmitting a timed impulse to a receiving instrument during the period said motor is in operation.

3. A telemetric transmitter comprising a shaft driven at a speed proportional to the quantity being measured, a magnetic clutch on such shaft, a cage rotated in a forward direction at a speed proportional to the quantity being measured upon energization of the magnetic clutch, a contact strip mounted on said cage, a contactor adapted to engage said strip during forward movement of said cage, means including a constant speed motor for reversing the movement of the cage at a constant speed, a power connection to said motor through said contactor and said contact strip, and timing means alternately closing a circuit to said magnetic clutch for a predetermined portion of each cycle and through said power connection for the balance of the cycle, whereby the motor is operated for the period required to return the cage to its original position, and means for transmitting a timed impulse to a receiving instrument during the period said motor is in operation.

4. A telemetric transmitter comprising a shaft adapted to be driven at a speed proportional to the quantity being measured, a magnetic clutch on such shaft, a contact member rotatable in a forward direction upon energization of the magnetic clutch through an angle proportional to the speed of rotation of said shaft, a stationary contact member engaging said rotatable contact member during the period of forward rotation and disengaging said member when said rotatable contact member has moved in reverse through the angle proportional to the speed of rotation of said shaft, means including a constant speed motor operatively connected to said rotatable contact member and adapted to reverse the movement of the rotatable contact member at a constant speed, and timing means adapted to alternately close a circuit through said magnetic clutch for a predetermined portion of each cycle and a second circuit to said motor through said contact members for the balance of the cycle, whereby the motor is operated for a period proportional to the speed of the said shaft, and means for transmitting a timed impulse to a receiving instrument during the period said motor is in operation.

5. A telemetric transmitter comprising a shaft adapted to be constantly rotated at a speed proportional to the quantity being measured, a clutch mounted on said shaft, said clutch having one portion rigidly secured to said shaft and a free portion freely rotatable in respect to said shaft, means normally disengaging said portions, clutch operative means adapted to cause engagement of said clutch portions, means holding said free portion against rotation during periods of disengagement of said portions, a gear connected to said freely rotatable portion of said clutch, a second gear mounted in opposed relationship to said first mentioned gear, a constant speed motor operatively connected to said second gear, planetary gears connecting said first and second gears, a rotatable planetary gear cage associated with said gears, said planetary gears being mounted in said gear cage and meshing with each of said first and second gears, an arcuate contactor carried by said cage, a fixed contactor engaging said arcuate contactor, and a timer alternately operating said clutch operative means for a predetermined time and closing a circuit through said contactors to said motor and to an instrument to be operated.

6. A telemetric transmitter comprising a shaft rotatable at a speed proportional to the quantity being measured, a magnetic clutch mounted on said shaft, a clutch plate associated with said magnetic clutch and adapted to be in engagement with said clutch when said clutch is energized, means normally disengaging said clutch and plate, a gear driven by said clutch plate, a second gear mounted in opposed relationship to said first mentioned gear, a constant speed motor operatively connected to said second gear, planetary gears connecting said first and second gears, a rotatable planetary gear cage associated with said gears, said planetary gears being mounted in said gear cage and meshing with each of said first and second gears, a movable contactor mounted on said cage, a fixed contactor adapted to engage said movable contactor during the period of forward movement of said movable contactor and disengaging said movable contactor when said movable contactor has been moved in a reverse direction through an angle equal to its forward movement, and a timer alternately closing a circuit to said magnetic clutch for a predetermined time and a second circuit through said contactors to said motor and to an instrument to be operated.

7. A telemetric transmitter comprising a shaft rotatable at a speed proportional to the quantity being measured, a magnetic clutch mounted on said shaft, said clutch having one portion rigidly secured to said shaft and a free portion normally disengaged from said shaft but held to said first portion upon energization of said clutch, a gear connected to the free portion of said clutch, a second gear mounted in opposed relationship to said first mentioned gear, a constant speed motor operatively connected to said second gear, planetary gears connecting said first and second gears, a planetary gear cage associated with said gears, said planetary gears being mounted in said gear cage and meshing with each of said first and second gears, a fixed contactor associated with said cage, a second contactor mounted on said cage and adapted to engage said fixed contactor for a portion only of rotation of said cage, and a timer alternately closing a circuit to said magnetic clutch for a predetermined time and a second circuit through said contactors to said motor and to an instrument to be operated.

WALTER J. HUGHES.

REFERENCES CITED

The following references are of record in the file of this patent:

UNITED STATES PATENTS

| Number | Name | Date |
|---|---|---|
| 2,329,370 | Hicks | Sept. 14, 1943 |